United States Patent [19]
Jensen et al.

[11] 3,956,576
[45] May 11, 1976

[54] INSULATOR FOR BATTERY CONNECTIONS

[75] Inventors: Henry E. Jensen, Lafayette Hill; Franz M. Wagner, Lansdale, both of Pa.

[73] Assignee: Eltra Corporation, Toledo, Ohio

[22] Filed: Dec. 12, 1974

[21] Appl. No.: 532,135

[52] U.S. Cl. .................. 174/138 F; 136/135 S; 136/181; 339/116 R
[51] Int. Cl.² ..................................... H01R 13/44
[58] Field of Search ............ 174/5 R, 74 A, 138 F, 174/139, 92; 136/135 R, 135 S, 163, 181; 339/29 B, 95 B, 114, 115 R, 115 C, 116 R, 116 C, 213 R, 213 T, 224–240, 26, 36; 150/52 R; 74/608

[56] References Cited
UNITED STATES PATENTS

| | | | |
|---|---|---|---|
| 914,042 | 3/1909 | Harrison et al. ................ | 174/5 R |
| 1,598,155 | 8/1926 | Salisbury ......................... | 174/5 R |
| 2,800,522 | 7/1957 | Coleman et al. ................. | 136/181 X |
| 2,825,880 | 3/1958 | Wechsler ......................... | 339/116 C |
| 3,112,148 | 11/1963 | Wochner ......................... | 174/92 X |
| 3,544,953 | 12/1970 | Shannon ........................ | 339/116 R |
| 3,639,681 | 2/1972 | Ettlinger ......................... | 174/138 F |

FOREIGN PATENTS OR APPLICATIONS

| | | | |
|---|---|---|---|
| 526,803 | 3/1954 | Belgium ......................... | 339/116 R |
| 573,123 | 11/1945 | United Kingdom ............. | 339/116 R |

Primary Examiner—Laramie E. Askin
Attorney, Agent, or Firm—Keith D. Moore

[57] ABSTRACT

An electrical insulator for covering interconnected terminals of adjacent batteries includes a pair of terminal cover members each covering a battery post along with a portion of a conductor bolted to the battery posts and an intermediate cover member having an inverted trough-shaped configuration for receiving the length of the conductor extending between the pair of terminal covers and overlapping a portion of the terminal cover members, thereby enabling the length of the insulator to be adjusted to cover battery terminals interconnected with different lengths of conductors. The insulator is fastened to the battery connection by providing the intermediate cover with inwardly extending flanges and forming it from a resilient material so that it will yieldingly flex as it is placed into position, whereupon the flanges are resiliently urged beneath the interconnecting conductor to secure the insulator to the battery connection. In an alternative embodiment, the intermediate cover is adjustable lengthwise by forming it in two similar pieces with one piece being slidably received in the other piece.

2 Claims, 7 Drawing Figures

U.S. Patent May 11, 1976 Sheet 1 of 2 3,956,576
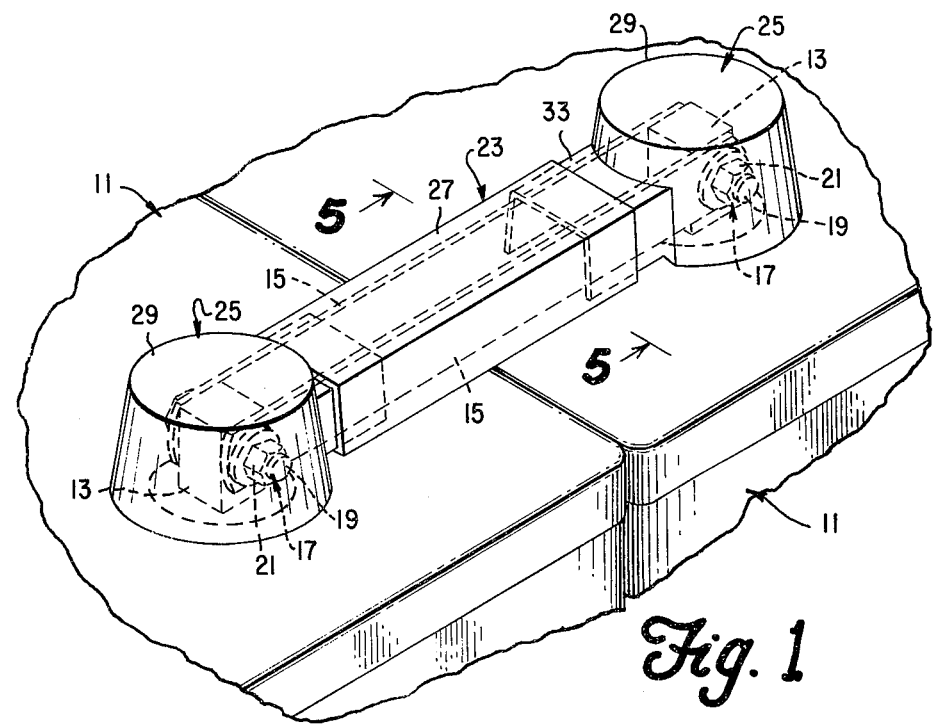
Fig. 1
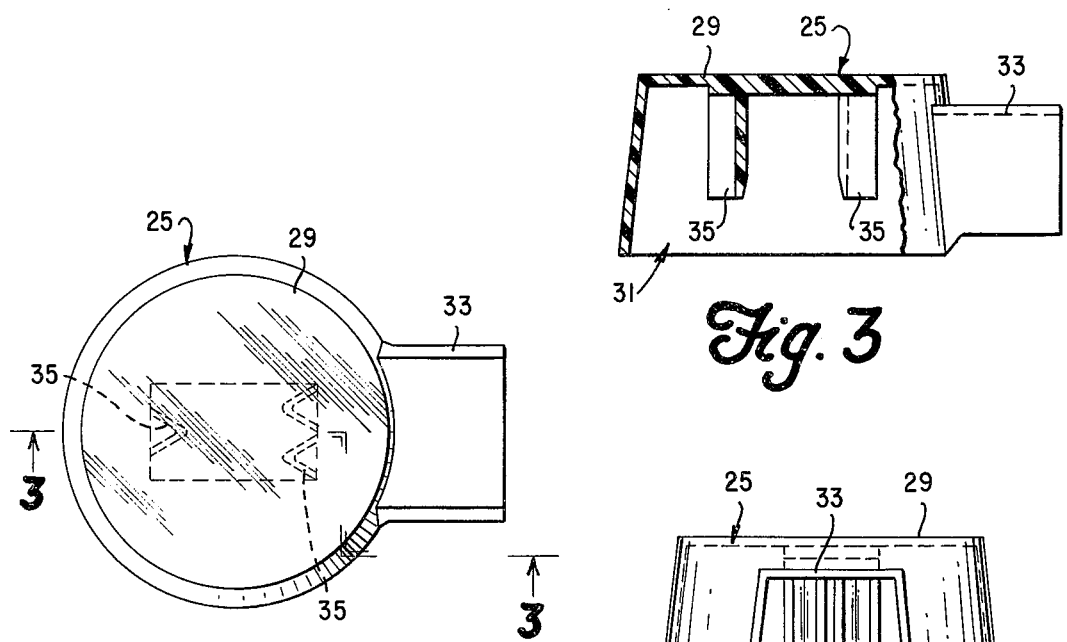
Fig. 3
Fig. 2
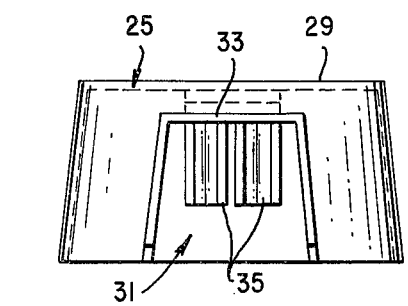
Fig. 4

INSULATOR FOR BATTERY CONNECTIONS

This invention relates to electrical insulators for battery connections, and more particularly to electrical insulators for covering the battery connections of a plurality of batteries interconnected in a network for providing energy to an electrical installation, for example a communications or data processing system.

In a network of batteries for energizing an electrical installation, the terminals of a plurality of adjacent batteries are connected together by elongated conductors in the form of metal straps to provide a greater current capacity or a higher voltage to the installation. Typically, the batteries utilize an electrolyte having a water content which diminishes with use and must be replenished through openings in the batteries which are located in close proximity to the exposed battery terminals and conductors. Moreover, the openings for replenishing the electrolyte are sometimes covered by threaded caps which are screwed onto threaded rims surrounding each opening, and the threaded caps must be manually removed and then replaced each time the electrolyte is replenished. However, the close proximity of the large number of exposed battery terminals and conductors to the openings for replenishing the electrolyte constitutes a hazard to the personnel who service the batteries as well as to other personnel who may be working nearby, particularly when the batteries are connected together to provide a higher voltage, for example 48 volts or more.

In the past, there have been insulating covers which are generally boxshaped with an open end for receiving a battery post and with a narrow slot in the side wall leading to an opening for receiving a cable connected to the battery post. The insulating covers were constructed from a resilient material, and the cable was inserted through the slot in the flexible wall to the opening and thereby secured the cover to the battery post. However, such insulating covers have not been satisfactory since they left the connecting cables exposed.

In addition, there have been attempts to cover the exposed battery connections with pieces of insulating plastic piping which are split apart longitudinally and clamped to the conductor straping by brackets at each end of the split piping. However, such attempts have been unsatisfactory since the split piping did not cover the battery terminals and was not readily removable for enabling a battery to be disconnected from the network for repair or replacement. Moreover, due to the open ends of the piping, such an arrangement was unsatisfactory even when the split piping was sufficiently long to cover the battery terminals in addition to the interconnecting conductor. Furthermore, the conductors interconnecting the battery terminals in the network are often of different lengths, thereby reducing the interchangeability of the different pieces of insulator piping and often necessitating each piece of insulator piping being cut to size for each particular battery connection.

Accordingly, an object of the invention is to provide an easily removable electrical insulator for covering both a battery terminal and an elongated conductor attached to it.

Another object of the invention is to provide an electrical insulator which may be adjusted to cover battery connections having different lengths of elongated conductors.

Still other objects, features and advantages of the present invention will be apparent to those skilled in the art from a reading of the following detailed description of the invention, taken in conjunction with the accompanying drawing, wherein:

FIG. 1 shows an electrical insulator constructed according to the present invention and covering the interconnected terminals of two batteries;

FIG. 2 is a plan view of an end portion of the electrical insulator shown in FIG. 1;

FIG. 3 is a sectional view of the end portion of the electrical insulator taken along the lines 3—3 in FIG. 2;

FIG. 4 is an end view of the portion of the insulator shown in FIG. 2;

Figure 5:
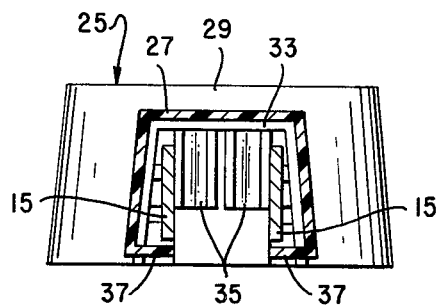
FIG. 5 is a cross-sectional view of the insulator taken along the lines 5—5 in FIG. 1.

Referring now in detail to the figures of the drawing, and more particularly to FIG. 1, there is shown a portion of a network of interconnected batteries, generally indicated 11, which are arranged in side-by-side abutting relationship to each other. Each of the batteries 11 has terminals 13 in the form of upright posts, and the terminals 13 of adjacent batteries 11 are connected together by a pair of conductors 15 which are secured to opposite sides of the battery posts 13 by suitable fastening means, generally indicated 17. As shown, the conductors 15 are in the form of metal straps which are clamped to the battery posts 13 by fastening means 17 in the form of threaded bolts 19 which may be received through openings (not shown) in the conductors 15 and battery posts 13 and secured thereto by threaded nuts 21. The other portions of the battery network as well as the details of the batteries 11 and the openings through which the threaded bolts are received are not shown since they form no part of the invention and may be desirably conventional.

In accordance with the present invention, the electrical connections between adjacent batteries 11 in the network are covered with an elongated insulator, generally indicated 23, having terminal cover members 25 at each end for covering the battery posts 13 and an intermediate cover member 27 for covering the conductor straps 15 which are bolted to the battery posts 13. As more particularly shown in FIGS. 2 - 4, the terminal cover members 25 have an inverted cup-shaped portion 29 with an interior opening, generally indicated at 31, in which the battery post 13 is received, and an inverted trough-shaped portion 33 leading into the interior opening 31 of the inverted cup-shaped portion 29 for receiving a length of the conductor straps 15 adjacent to the battery posts 13. As more particularly shown in FIGS. 1 and 5, the intermediate cover member 27 has an inverted trough-shaped form for receiving the exposed length of the conductor straps 15 extending between the terminal cover members 25 as well as overlapping a part of the inverted trough-shaped portions 33 of the terminal cover members 25. Accordingly, the length of the insulator 23 may be adjusted to cover different lengths of conductor straps 15 by varying the amount that the intermediate cover member 27 overlaps the inverted trough-shaped portions 33 of the terminal cover members 25.

The terminal cover members 25 and the intermediate cover member 27 are constructed from a suitable electrically insulating material which is chemically inert to the electrolyte of the battery and resiliently deformable. Suitable materials may include plastics such as polyvinylcarbonate or polycarbonate, and the members 25, 27 of the insulator 23 may be constructed by injection molding or vacuum forming.

To position the insulator 23 relative to the battery terminals 13, each of the terminal cover members 25 is provided with locating means in the form of fingers 35 depending from the base of the inverted cup-shaped portion 29, and spaced-apart for engaging opposite sides of the battery post 13 as it is received into the interior opening 31 of the terminal cover member 25. Although the fingers 35 may be resilient and arranged to frictionally engage the battery post 13, the insulator 23 is further secured to the battery connection by the intermediate cover member 27 which serves as a fastening means and has flanges 37 extending inwardly under the conductor straps 15. As more particularly shown in FIG. 5, the flanges 37 are formed on the bottom of the resilient intermediate cover member 27 which yieldingly flexes as it is placed into position on the battery connection, whereupon the flanges 37 are resiliently urged beneath the conductor straps 15 to secure the intermediate cover member 27 as well as the terminal cover members 25 to the battery connection.

Figure 6:
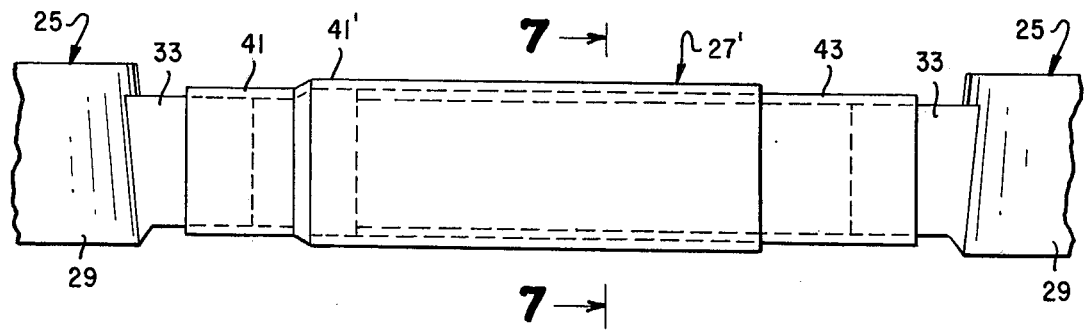
FIG. 6 is side elevational view of another embodiment of an electrical insulator constructed in accordance with the present invention.
Figure 7:
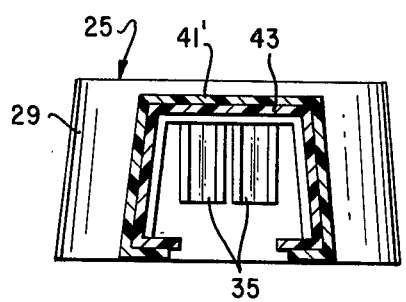
FIG. 7 is a cross-sectional view of the embodiment in FIG. 6 taken along the lines 7—7.

In accordance with a further feature of the invention, the intermediate cover member 27 may be made adjustable in length so as to cover a still greater range of different lengths of battery connections. An alternative embodiment 27' of the intermediate cover member is shown in FIGS. 6 and 7 and is composed of two elongated pieces 41, 43 each having an inverted trough-shaped form for receiving the conductor 15. However, one of the pieces 41 has a portion 41' with an enlarged interior opening for slidably receiving the end of the other piece 43, thereby providing an overlap between the pieces 41, 43 which enables the intermediate cover member 27' to be extended lengthwise to cover various lengths of conductor straps 15. As discussed above, the intermediate cover member 27' may be resilient and have inwardly extending flanges for securing itself as well as the terminal cover members 25 to the battery connection.

What is claimed is:
1. An electrical insulator, comprising:
   a cover member having an inverted cup-shaped portion with an interior opening for receiving a battery post having a rectangular-shaped cross-sectional configuration and an inverted trough portion leading into the interior opening of the inverted cup-shaped portion for receiving a pair of elongated conductors connected to opposite sides of the battery post,
   said cover member having a pair of spaced-apart locating fingers disposed in the interior opening of the inverted cup-shaped portion for receiving the battery post therebetween and engaging opposite side portions of the battery post located between the pair of elongated conductors for laterally positioning said cover member relative to the battery post as it is received in the interior opening of the inverted cup-shaped portion,
   fastening means in the form of an inverted trough-shaped member receiving the inverted trough portion of said cover member, and
   said fastening means having inwardly extending flanges formed on the lower portion thereof and being resilient for yieldingly flexing upon receiving said cover member and urging the flanges beneath the elongated conductors connected to the battery post.
2. The electrical insulator according to claim 1, further comprising:
   another cover member having an inverted cup-shaped portion with an interior opening for receiving a battery post having a rectangular-shaped cross-sectional configuration and an inverted trough portion leading into the interior opening of the inverted cup-shaped portion for receiving a pair of elongated conductors connected to opposite sides of the battery post,
   said other cover member having a pair of spaced-apart locating fingers disposed in the interior opening of the inverted cup-shaped portion for receiving the battery post therebetween and engaging opposite side portions of the battery post located between the pair of elongated conductors for laterally positioning said cover member relative to the battery post as it is received in the interior opening of the inverted cup-shaped portion,
   said fastening means also receiving the inverted trough portion of said other cover member for securing said other cover member to the elongated conductors,
   said fastening means being formed by first and second elongated pieces each having an inverted trough-shaped configuration with inwardly extending flanges formed in the lower portion thereof, and
   said first elongated piece being slideably received in said second elongated piece for enabling the length of said fastening means to be slideably adjustable.

* * * * *